No. 831,814. PATENTED SEPT. 25, 1906.
J. C. WILLIAMSON & W. D. BARKER.
COMBINED VALVE STEM CLAMP AND LUBRICATOR.
APPLICATION FILED FEB. 21, 1906.
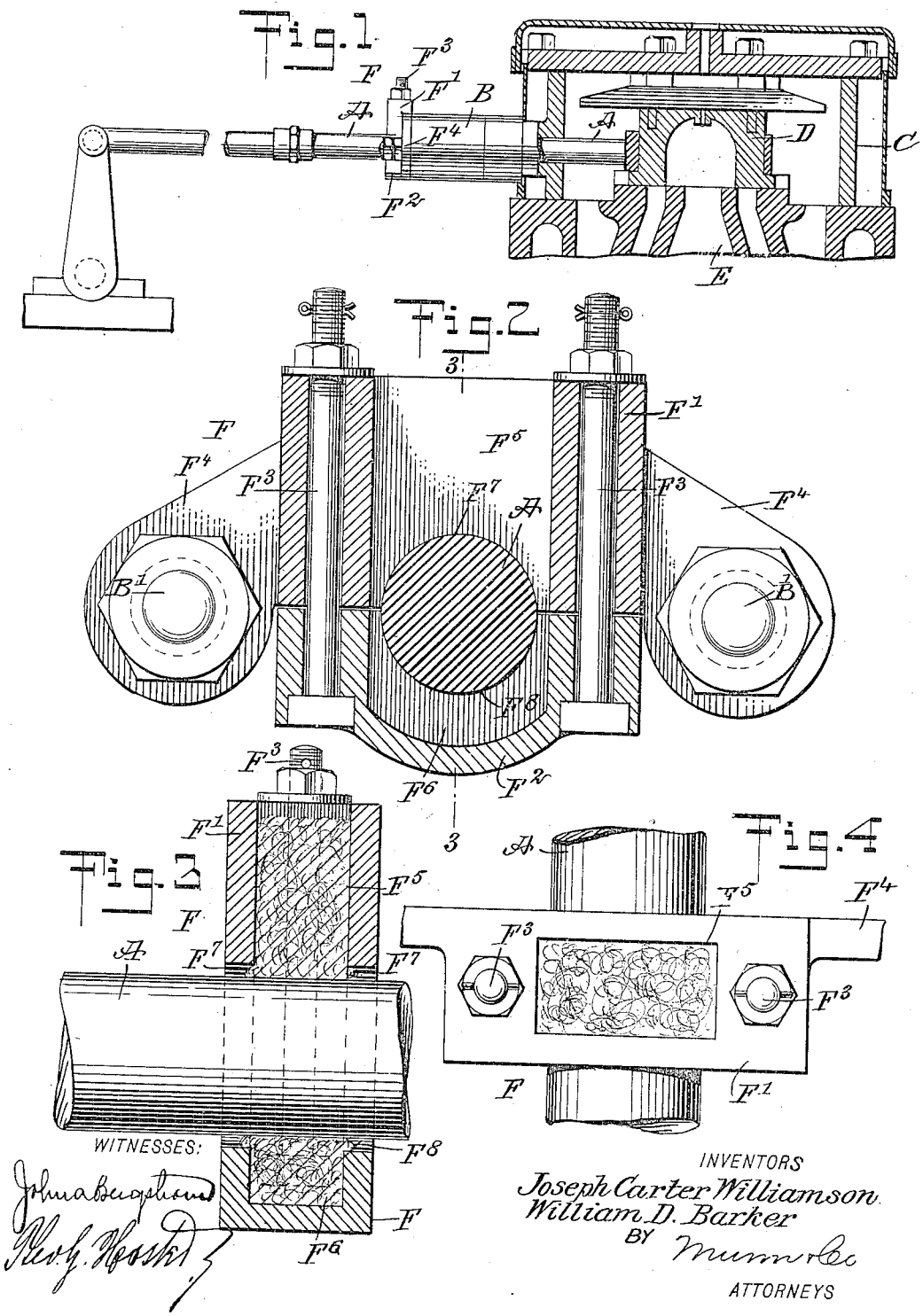
WITNESSES:
INVENTORS
Joseph Carter Williamson
William D. Barker
BY
ATTORNEYS

UNITED STATES PATENT OFFICE.

JOSEPH CARTER WILLIAMSON AND WILLIAM DOBBS BARKER, OF TALLAHASSEE, FLORIDA.

COMBINED VALVE-STEM CLAMP AND LUBRICATOR.

No. 831,814.    Specification of Letters Patent.    Patented Sept. 25, 1906.

Application filed February 21, 1906. Serial No. 302,219.

*To all whom it may concern:*

Be it known that we, JOSEPH CARTER WILLIAMSON and WILLIAM DOBBS BARKER, citizens of the United States, and residents of Tallahassee, in the county of Leon and State of Florida, have invented a new and Improved Combined Valve-Stem Clamp and Lubricator, of which the following is a full, clear, and exact description.

The invention relates to locomotive-engines; and its object is to provide a new and improved combined valve-stem clamp and lubricator arranged to lubricate the valve-stem outside and immediately adjacent to the stuffing-box and to permit the engineer to quickly and securely lock the valve-stem, and hence the valve, against movement in case of a breakdown of the corresponding engine to allow running of the locomotive by the use of the other engine alone.

The invention consists of novel features and parts and combinations of the same, which will be more fully described hereinafter and then pointed out in the claims.

A practical embodiment of the invention is represented in the accompanying drawings, forming a part of this specification, in which similar characters of reference indicate corresponding parts in all the views.

Figure 1 is a side elevation of the improvement as applied, the cylinder, the valve, and the steam-chest being shown in section. Fig. 2 is an enlarged cross-section of the improvement as applied. Fig. 3 is a sectional side elevation of the same on the line 3 3 of Fig. 2, and Fig. 4 is a plan view of the same.

The valve-stem A of each locomotive-engine of a locomotive extends through the usual stuffing-box B into the steam-chest C to connect with a slide-valve D, controlling the admission and exhaust of the steam to the cylinder E. The combined valve-stem clamp and lubricator F is arranged on the outer end of the stuffing-box B and consists, essentially, of two members F' and F$^2$, connected with each other by bolts F$^3$ to hold the members F' and F$^2$ in proper relation to each other and to allow of clamping the members F' and F$^2$ firmly onto the valve-stem A to hold the latter and the valve D against movement, as hereinafter more fully explained. The members F' and F$^2$ are shown located one above the other, and the upper member F' is provided with sidewise-extending apertured ears F$^4$, engaging the stuffing-box bolts B', so as to securely hold the combined valve-stem clamp and lubricator F in position on the outer end of the stuffing-box B. The members F' and F$^2$ are provided with a receptacle for containing a lubricant, the said receptacle being partly formed by a vertically-disposed aperture F$^5$ in the member F' and a recess F$^6$ in the member F$^2$, as will be readily understood by reference to Fig. 2, so that the receptacle can be readily filled with a lubricant, preferably in the form of waste saturated with oil and the like. The end walls of the members F' and F$^2$ are formed with a passage for the valve-stem A, and this passage is partly made in the member F' and partly in the member F$^2$ by forming said members with segmental recesses F$^7$ and F$^8$ at opposite sides of their joint. Thus the valve-stem A extends longitudinally through the receptacle containing the lubricant, and consequently the valve-stem A is properly lubricated adjacent to the outer end of the stuffing-box B.

In case the engine breaks down and it is desired by the engineer to lock the valve D in its central position, as shown in Fig. 1, then it is only necessary to screw up the nuts of the bolts F$^3$, so as to draw the member F$^2$ up with a view to firmly clamp the valve-stem A, thus holding the latter against longitudinal movement, it being understood that the gear for operating the valve-stem A is uncoupled, so that the engineer is able to proceed on the journey by the use of the other engine alone.

The combined valve-stem clamp and lubricator is very simple and durable in construction and can be readily attached to existing engines without altering any of the parts thereof.

Having thus described our invention, we claim as new and desire to secure by Letters Patent—

1. A combined valve-stem clamp and lubricator, comprising upper and lower members having vertical registering recesses forming a chamber for the lubricant, and transverse recesses coacting to form an opening for the passage of the valve-stem, said chamber communicating with said opening, said upper member having ears provided with openings for receiving the stuffing-box bolts, and vertical bolts traversing both of the members and provided with nuts whereby to tighten said members on the valve-stem.

2. A combined valve-stem clamp and lubricator, comprising upper and lower members having registering recesses forming a chamber for lubricant, and having recesses coacting to form an opening for the passage of the valve-stem, said chamber communicating with said opening, and bolts traversing both of said members, and provided with nuts whereby to tighten said members on the valve-stem.

In testimony whereof we have signed our names to this specification in the presence of two subscribing witnesses.

JOSEPH CARTER WILLIAMSON.
WILLIAM DOBBS BARKER.

Witnesses:
PAULINE COSTA,
B. F. WILLIS.